United States Patent
Probst et al.

[11] Patent Number: 6,087,422
[45] Date of Patent: Jul. 11, 2000

[54] BARRIER LAYER COMPOSITION FOR PLASTIC BODIES

[75] Inventors: Werner Probst, Bad Soden-Salünster; Peter Knobloch, Tegernheim; Christoph Roth, Halle; Hans-Jürgen Müller, Sandersdorf, all of Germany

[73] Assignee: Plastic Omnium GmbH, Germany

[21] Appl. No.: 09/203,647

[22] Filed: Dec. 1, 1998

[30] Foreign Application Priority Data

Dec. 8, 1997 [DE] Germany .......................... 197 54 456

[51] Int. Cl.$^7$ ....................................... C08K 5/15
[52] U.S. Cl. .......................... 524/114; 523/216; 523/212
[58] Field of Search ............................. 524/114; 523/216, 523/212

[56] References Cited

U.S. PATENT DOCUMENTS

| | | | |
|---|---|---|---|
| 5,849,110 | 12/1998 | Blohowiak | 148/247 |
| 5,958,578 | 9/1999 | Blohowiak | 428/336 |

FOREIGN PATENT DOCUMENTS

| | | |
|---|---|---|
| 0202180 | 11/1986 | European Pat. Off. . |
| 0551819 | 1/1993 | European Pat. Off. . |
| 3925901 | 11/1990 | Germany . |

*Primary Examiner*—Paul R. Michl
*Attorney, Agent, or Firm*—Londa & Gluck LLP

[57] ABSTRACT

The present invention describes a barrier layer composition which is applied to at least one surface of a plastic body, preferably a polyolefin hollow body, having the following composition:

(a) 35 to 75% by weight of an epoxide-containing or halogen- and epoxide-containing metal oxide sol;

(b) 20 to 60% by weight of a fluorine- or sulfo-containing maleic acid hemi ester copolymer or a fluorine- or sulfo-containing maleic acid hemi amide copolymer having the general structural formula

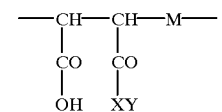

wherein M=vinyl monomer; X=oxygen, nitrogen;
Y=—$(CH_2)_n$—$SO_3H$, —$(CH_2)_n$—F, —$(CF_2)_n$—H;
n=2 to 12;

(c) 0.5 to 5% by weight of a catalyst based on one or more tertiary amines.

28 Claims, No Drawings

BARRIER LAYER COMPOSITION FOR PLASTIC BODIES

The invention relates to a barrier layer composition for plastic bodies, and in particular it relates to hollow plastic bodies preferably consisting of polyolefins. The composition exhibits an improved barrier effect against the leakage of volatile organic hydrocarbons, for example gasoline, aromatics or mineral oil.

Today, hollow plastic bodies are widely used as packaging material for solid and liquid organic substances. They are superior with respect to their chemical resistance, their good mechanical properties as well as their low own weight. A further advantage is that they may be easily formed into manifold and diverse shapes wherein especially high density polyolefins (HDPE) dominate for economical reasons. If such containers are used e.g. as automotive fuel tanks they have the disadvantage that although polyethylene complies with the requirements regarding its mechanical properties it shows a certain leakiness for aromatics e.g. in fuels. To overcome this disadvantage, several suggestions have been made such as (a) generation of laminated structures by co-extrusion (e.g. with polyamides, EVOH, etc.);
(b) surface modification for example by fluorination, sulfonation, etc.;
(c) coating with barrier layers by varnishing.

The manufacture of large volume, blow-moulded hollow bodies having laminated structures is rather cost-intensive and problematic with respect to production technique, and frequently the containers fail to comply with the test requirements for fuel tanks. Therefore, processes have been widely used in practice which result in a reduction of the permeation by means of surface modification. Examples for such methods are sulfonation (DE 1 953 321, U.S. Pat. No. 3,740,258), fluorination (Gas Aktuell 1993, 45, p. 9, Plast. Eng. 1978, 34, p. 4, JP 61 230 919) as well as carrying out a plasma polymerization (DE 4 318 086, EP 302 457, EP 739 655). However, the processes using highly toxic and chemically aggressive gases require high efforts with regard to materials and safety techniques.

It is further known to deposit $SiO_x$ layers having a barrier effect by decomposition of silicon-organic compounds in plasma (Vak. Prax. 1991, 3, p. 27). Furthermore, the patent documents EP 558 886 and 551 819 suggest to treat the inner surfaces of hollow bodies with moisture-setting diisocyanates following plasma treatment. This method is disadvantageous in that it requires the use of highly toxic compounds and is also difficult to carry out with respect to manufacturing technique.

Coating with layers of varnish to suppress permeation is also well known. Thus, it has been suggested to use as a varnish binder polyepoxide in combination with plastifying polyurethanes (DE 3 447 022) or in combination with sulfonation using urea or melamine formaldehyde resins as binders (GB 2 069 870). However, these processes are only insufficiently effective in preventing permeation.

Therefore, it is an object of the present invention to develop a novel barrier layer for plastic bodies which does not require any treatment in the form of a sulfonation or fluorination and which does not use any aggressive or highly toxic components during the coating according to well known coating technologies.

According to the invention, this object has been solved by providing a barrier layer composition substantially including the following components:

(a) 35 to 75% by weight of an epoxide-containing or halogen- and epoxide-containing metal oxide sol;
(b) 20 to 60% by weight of a fluorine- or sulfo-containing maleic acid hemi ester copolymer or a fluorine- or sulfo-containing maleic acid hemi amide copolymer having the general structural formula

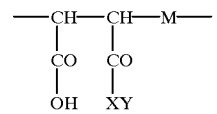

wherein
M=vinyl monomer;
X=oxygen, nitrogen;
Y=—$(CH_2)_n$—$SO_3H$, —$(CH_2)_n$—F, —$(CF_2)_n$—H;
n=2 to 12;
(c) 0.5 to 5% by weight of a catalyst based on one or more tertiary amines.

Further preferred embodiments of the barrier layer composition according to the invention substantially include the following components:

(a) 45 to 65% by weight of an epoxide-containing or halogen- and epoxide-containing metal oxide sol;
(b) 30 to 50% by weight of a fluorine- or sulfo-containing maleic acid hemi ester copolymer or a fluorine- or sulfo-containing maleic acid hemi amide copolymer having the general structural formula

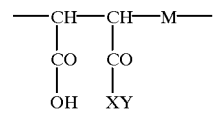

wherein
M=vinyl monomer;
X=oxygen, nitrogen;
Y=—$(CH_2)_n$—$SO_3H$, —$(CH_2)_n$—F, —$(CF_2)_n$—H;
n=2 to 12;
(c) 1 to 5% by weight of a catalyst based on one or more tertiary amines; or
(a) 45 to 55% by weight of an epoxide-containing or halogen- and epoxide-containing metal oxide sol;
(b) 40 to 50% by weight of a fluorine- or sulfo-containing maleic acid hemi ester copolymer or a fluorine- or sulfo-containing maleic acid hemi amide copolymer having the general structural formula

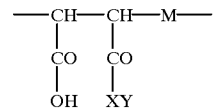

wherein
M=vinyl monomer;
X=oxygen, nitrogen;
Y=—$(CH_2)_n$—$SO_3H$, —$(CH_2)_n$—F, —$(CF_2)_n$—H;
n=2 to 12;
(c) 3 to 5% by weight of a catalyst based on one or more tertiary amines.

The barrier layer composition provided according to the invention is particularly suitable for hollow bodies made of polyolefins, for example polyethylene. For example, the barrier layer composition may be applied by varnishing, and it is for example particularly effective in suppressing the leakage of aromatics from fuels. It is especially suitable for plastic hollow bodies, preferably those made of polyolefins such as polyethylene or polypropylene. Further examples for plastic materials which may be coated are PET and PVC.

The barrier layer composition according to the invention which may also be referred to as a blocking layer composition is preferably useful for polyolefin bodies in particular for polyolefin hollow bodies, to at least one surface of which it is applied. However, other fields of use are also comprised according to the invention. These include for example the application of a barrier layer to solvent-sensitive varnish layers. Of course, the solvents contained in the coating solution for applying the barrier layer composition of the present invention will be selected so that they do not attack the varnish layers.

Further advantages of the barrier layer composition of the invention are its good adhesion e.g. to polyolefins as well as its effective reduction of permeation. The blocking layer is applied to at least one surface of polyolefin hollow bodies. As the polyolefin, polyethylene is preferred. The blocking layer reduces the permeation of organic substances, for example of organic solvents, volatile hydrocarbons and aromatics, such as of gasoline and mineral oils, pesticides, cosmetics, i.e. of materials and particularly liquids whose diffusion is to be prevented. In a preferred embodiment of the invention the barrier layer composition is applied to an automotive fuel tank.

In one embodiment of the invention the blocking layer composition additionally contains 0.1 to 25% by weight, based on the total composition, of additives which do not or only slightly affect the function of the composition as a blocking layer. In preferred embodiments of the invention, the additives are present in an amount of 0.1 to 1% by weight, 3 to 20% by weight or 5 to 15% by weight, each based on the total composition. Preferably, the additives are dyes or dye pigments. According to the invention, also fillers may be used insofar as they do not or only marginally affect the blocking layer function of the composition of the invention.

The metal oxide sols according to the invention may be prepared in a well known manner using sol/gel technology by hydrolyzing and condensing metal alkoxide compounds, preferably those of silicon, in the presence of solvents and catalysts (see R. Reisfeld, C. K. Jörgensen, "Chemistry, Spectroscopy, and Application of Sol/Gel Glasses, Structure and Bonding 77, Springer Verlag 1996). An example for the preparation of the metal oxide sols according to the invention is the acid hydrolysis of glycidyl silane in water/solvent mixtures. Preferably, mixtures of acetone and water are used as solvents for hydrolysis.

Examples for epoxide-containing or halogen-containing silicon compounds are
 glycidyloxypropyl trimethoxy silane
 glycidyloxypropyl triethoxy silane
 2-(3,4-epoxycyclohexyl)ethyl trimethoxy silane
 chloropropyl trimethoxy silane
 tridecafluorooctyl triethoxy silane In addition, besides silicon the metal oxides may also contain aluminium, titanium, or zirconium in the form of an oxide. Examples for preferred metal oxide sols are the starting mixtures of the following alkoxide compounds:
 75% by weight tetraethoxy silane
 25% by weight glycidyloxypropyl trimethoxy silane
 50% by weight tetraethoxy silane
 25% by weight glycidyloxypropyl trimethoxy silane
 25% by weight 2-ethylhexyl titanate
 75% by weight glycidyloxypropyl trimethoxy silane
 25% by weight chloropropyl trimethoxy silane
 95% by weight glycidyloxypropyl trimethoxy silane
 5% by weight tridecafluorooctyl triethoxy silane The preparation of these metal oxide sols is preferably carried out in acetone, dioxane, methyl ethyl ketone, or tetrahydrofuran in the presence of mineral acids as catalysts.

The fluoro- or sulfo-containing maleic acid hemi ester copolymers or fluoro- or sulfo-containing maleic ester hemi amide copolymers used according to the invention may be conveniently prepared by polymer analogous reaction of maleic anhydride copolymers with fluorine-containing or sulfone-containing alcohols or amines.

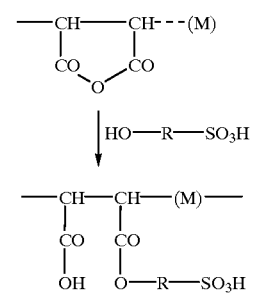

Preferably, this reaction is carried out in acetone or methyl ethyl ketone at 50 degrees. Examples for such fluorine- or sulfo-containing compounds are compounds having the following structural formulas:

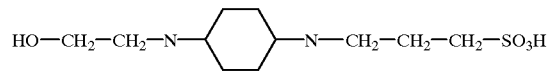

As the vinyl monomers, there may be contained styrene, α-methyl styrene, methyl vinyl ether, vinyl acetate, or acrylic esters in the copolymer.

The molecular weight of the polymers is not important and is preferably 5000 to 350,000 D.

As catalysts for the composition, there may be used tert. amines. Preferably, triethyl amine, dimethylbenzyl amine, or 1-methyl imidazole will be used.

As solvents for the coating there are preferably used ketones such as acetone or methyl ethyl ketone. In addition, also high-boiling varnish solvents may be used to improve the surface quality of the solidified layers as it is especially advantageous in the case of spray varnishing. Examples for such solvents are:
 propylene glycol methyl ether
 ethyl glycol
 toluene
 xylene
 butyl acetate The barrier layer may be applied on the outer surface, inner surface or to both surfaces of a plastic hollow body.

The coating may be applied in known manner by spray or dip varnishing or by application onto spray-casted welded plastic hollow bodies where preferably a layer having a thickness of 4 to 20 μm is employed.

It is advantageous to perform a surface treatment in a known manner in order to improve adhesion prior to coating.

A particularly suitable method for this purpose is flame treatment or the treatment by plasma such as for example oxygen plasma or inert gas plasma such as helium, argon, etc. This treatment serves to improve the adhesion of the coating and simplifies an optional further treatment of the surface.

The barrier layer according to the invention is excellent with respect to its good adhesion on plastics and is effective in preventing the permeation of hydrocarbons through the container walls. A further advantage is the low toxicity of the varnish components so that the application of the barrier layer does not require cost-intensive efforts with regard to safety technique as well as material technique.

The hollow bodies to which the barrier layer according to the invention has been applied are useful as storage containers for organic substances, in particular for fuels, mineral oils, or pesticides, or cosmetics. Generally, the barrier layer provided according to the invention is useful for coating of hollow bodies which are preferably used for the storage of liquids of which the diffusion is to be prevented or at least significantly reduced. Thus, the superior barrier effect may be utilized for coating of for example fuel tanks in automobiles or also for oil tanks.

In the following, the invention will be explained in more detail with respect to Examples and Comparative Examples. However, the invention is not limited to these specific Examples.

EXAMPLES AND COMPARATIVE EXAMPLES

Example 1

Preparation of an Epoxide-Containing Metal Oxide Sol (sol 1)

1000 ml of acetone are placed in a 2 liter three-necked flask equipped with a stirrer and inside and 250 ml of 0.1 N HCl are added. To this solution 250 ml of glycidyloxypropyl trimethoxy silane are added dropwise within 30 min. Stirring is continued for 8 hours at room temperature. A clear solution is obtained which is filtered prior to use.

Example 2

Preparation of a Chloro- and Epoxide-Containing Metal Oxide Sol (sol 2)

In analogous manner to Example 1 1000 ml of acetone are placed in a flask, added with 250 ml of 0.1 N HCl and while stirring a mixture of 160 ml glycidyloxypropyl trimethoxy silane and 90 ml 3-chloropropyl trimethoxy silane is added dropwise.

Example 3

Preparation of a Fluorine- and Epoxide-Containing Metal Oxide Sol (sol 3)

In analogous manner to Example 1 1000 ml of acetone 250 ml of 0.1 N HCl are placed in a flask and a mixture of 12.5 ml tridecafluorooctyl trimethoxy silane 237.5 ml glycidyloxypropyl trimethoxy silane are added.

Example 4

Preparation of a Sulfo-Containing Maleic Acid Hemi Ester Styrene Copolymer (polymer 1)

900 g of acetone are placed in a heatable 2 liter reaction vessel equipped with stirrer and inside thermometer and 100 g of maleic anhydride styrene copolymer (molecular weight of 130,000 D) are added. The mixture is heated to 50 degrees and stirred until the polymer has dissolved. Afterwards, 65 g of hydroxypropane sulfonic acid are added dropwise, and the mixture is stirred at 50 degrees for 24 hours.

Example 5

Preparation of a Fluorine-Containing Maleic Acid Hemi Ester Styrene Copolymer (polymer 2)

In a manner analogous to Example 4 the polymer solution is reacted with 30 g of fluoroethanol.

Example 6

Comparative Example

A 0.5 l polyethylene bottle (HDPE, Lupolen® 4261) having a wall thickness of 0.5 mm is flame treated and dip varnished with the following coating solution:

500 ml of methyl ethyl ketone 40 g of bisphenol A diglycidol ether 9.6 g of isophorone diamine The layer is air-dried for 30 min and then after dried for 45 min at 85 degrees. A layer thickness of 4.1 μm is obtained. Then, the coated bottle is filled with 250 ml of premium fuel (unleaded) and sealed with an aluminium cap.

The gasoline loss due to permeation through the container wall at a storage temperature of 25 degrees is determined by weighing after 1 month. An uncoated bottle is used for comparison purposes. The effect of the barrier layer (by in %) results from the following equation:

$$bv\ (\%) = 100 - \frac{C1}{C2} \cdot 100$$

C1=weight loss of the coated bottle

C2=weight loss of the uncoated bottle

A blocking value of 42% is obtained. A bottle which is fluorinated according to a known manner results in a blocking value of 92%.

Example 8

In a manner analogous to Example 6 a coating is applied using the following solution composition:

200 ml of acetone 200 ml of methyl ethyl ketone 500 ml of metal oxide sol 1

301 g of polymer solution 1

2.4 g of triethyl amine

A blocking value of 97% is obtained.

Example 9

In a manner analogous to Example 6 a bottle treated with oxygen plasma is coated on the inner and on the outer surface using the following solution composition:

100 ml of acetone 100 ml of methyl ethyl ketone 500 ml of metal oxide sol 2

258 g of polymer solution 1

2.4 g of triethyl amine

A blocking value of 97% is obtained.

Example 11

In a manner analogous to Example 6 a bottle treated with oxygen plasma is coated using the following solution composition:

120 ml of acetone 80 ml of methyl ethyl ketone 500 ml of metal oxide sol 3

240 g of polymer solution 1
2.0 g of triethyl amine
A blocking value of 98% is obtained.

Example 12

In a manner analogous to Example 6 a bottle treated with argon plasma is coated using the following solution composition:
120 ml of acetone
50 ml of methyl ethyl ketone
500 ml of metal oxide sol 1
254 g of polymer solution 2
2.5 g of dimethyl benzyl amine
A blocking value of more than 98% is obtained.

We claim:

1. Barrier layer composition for plastic bodies, comprising:
   a) 35 to 75% by weight of an epoxide-containing or halogen- and epoxide-containing metal oxide sol;
   b) 20 to 60% by weight of a fluorine- or sulfo-containing maleic acid hemi ester copolymer or a fluorine- or sulfo-containing maleic acid hemi amide copolymer having the general structural formula

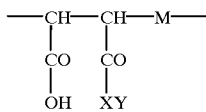

wherein
   M=vinyl monomer;
   X=oxygen, nitrogen;
   Y=—$(CH_2)_n$—$SO_3H$, —$(CH_2)_n$—F, —$(CF_2)_n$—H;
   n=2 to 12;
   c) 0.5 to 5% by weight of a catalyst based on one or more tertiary amines.

2. Barrier layer composition according to claim 1, comprising
   a) 45 to 65% by weight of an epoxide-containing or halogen- and epoxide-containing metal oxide sol;
   b) 30 to 50% by weight of a fluorine- or sulfo-containing maleic acid hemi ester copolymer or a fluorine- or sulfo-containing maleic acid hemi amide copolymer having the general structural formula

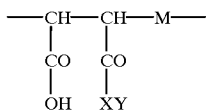

wherein
   M=vinyl monomer;
   X=oxygen, nitrogen;
   Y=—$(CH_2)_n$—$SO_3H$, —$(CH_2)_n$—F, —$(CF_2)_n$—H;
   n=2 to 12;
   c) 1 to 5% by weight of a catalyst based on one or more tertiary amines.

3. Barrier layer composition according to claim 1, comprising
   a) 45 to 55% by weight of an epoxide-containing or halogen- and epoxide-containing metal oxide sol;
   b) 40 to 50% by weight of a fluorine- or sulfo-containing maleic acid hemi ester copolymer or a fluorine- or sulfo-containing maleic acid hemi amide copolymer having the general structural formula

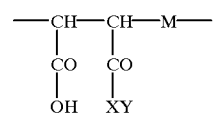

wherein
   M=vinyl monomer;
   X=oxygen, nitrogen;
   Y=—$(CH_2)_n$—$SO_3H$, —$(CH_2)_n$—F, —$(CF_2)_n$—H;
   n=2 to 12;
   c) 3 to 5% by weight of a catalyst based on one or more tertiary amines.

4. Barrier layer composition according to claim 1, wherein said epoxide-containing or halogen- and epoxide-containing metal oxide sols have been prepared from silicon alkoxide compounds, aluminium alkoxide compounds, titanium alkoxide compounds or zirconium alkoxide compounds or the mixtures thereof.

5. Barrier layer composition according to claim 1, wherein said metal oxide sol has been prepared by hydrolysis and condensation of glycidyloxypropyl trimethoxy silane.

6. Barrier layer composition according to claim 1, wherein said metal oxide sol has been prepared by hydrolysis and condensation of a mixture of glycidyloxypropyl trimethoxy silane and chloropropyl trimethoxy silane.

7. Barrier layer composition according to claim 1, wherein said copolymer has been prepared by reacting maleic anhydride copolymers with fluorine-containing or sulfo-containing alcohols or amines.

8. Barrier layer composition according to claim 1, wherein said copolymer is a sulfo-substituted copolymer or maleic acid hemi ester and styrene.

9. Barrier layer composition according to claim 1, wherein said copolymer has a molecular weight of 5000 to 350,000 D.

10. Barrier layer composition according to claim 1, wherein said vinyl monomer in the copolymer is styrene, α-methyl styrene, methyl vinyl ether, vinyl acetate, or acrylic ester.

11. Barrier layer composition according to claim 1, wherein the catalyst is triethyl amine, tributyl amine, 1-methyl imidazole or DABCO®.

12. Barrier layer composition according to claim 1, further comprising
   d) 0.1 to 25% by weight, based on the total composition, of additives which are compatible with the barrier layer composition.

13. Barrier layer composition according to claim 12, comprising 3 to 20% by weight, based on the total composition, of additives which are compatible with the barrier layer composition.

14. Barrier layer composition according to claim 12, comprising 5 to 15% by weight, based on the total composition, of additives which are compatible with the barrier layer composition.

15. Barrier layer composition according to claim 12, wherein said additives are dyes.

16. Coating solution for the preparation of a barrier layer for plastic bodies, comprising a barrier layer composition comprising (I)
a) 35 to 75% by weight of an epoxide-containing or halogen- and epoxide-containing metal oxide sol;
b) 20 to 60% by weight of a fluorine- or sulfo-containing maleic acid hemi ester copolymer or a fluorine- or sulfo-containing maleic acid hemi amide copolymer having the general structural formula

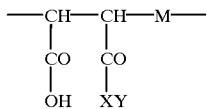

wherein
M=vinyl monomer;
X=oxygen, nitrogen;
Y=—$(CH_2)_n$—$SO_3H$, —$(CH_2)_n$—F, —$(CF_2)_n$—H;
n=2 to 12;
c) 0.5 to 5% by weight of a catalyst based on one or more tertiary amines together with
(II) at least one solvent.

17. Coating solution for the preparation of a barrier layer according to claim 16, wherein the solvent is a ketone.

18. Coating solution for the preparation of a barrier layer according to claim 16, wherein the solvent is propylene glycol methyl ether, ethyl glycol, toluene, xylene, or butyl acetate.

19. Coating solution for the preparation of a barrier layer according to claim 17, wherein the solvent is acetone or methyl ethyl ketone.

20. Plastic body having a coating of a barrier layer composition comprising
a) 35 to 75% by weight of an epoxide-containing or halogen- and epoxide-containing metal oxide sol;
b) 20 to 60% by weight of a fluorine- or sulfo-containing maleic acid hemi ester copolymer or a fluorine- or sulfo-containing maleic acid hemi amide copolymer having the general structural formula

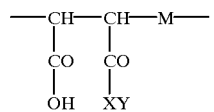

wherein
M=vinyl monomer;
X=oxygen, nitrogen;
Y=—$(CH_2)_n$—$SO_3H$, —$(CH_2)_n$—F, —$(CF_2)_n$—H;
n=2 to 12;
c) 0.5 to 5% by weight of a catalyst based on one or more tertiary amines.

21. Plastic body according to claim 20, wherein said body is a plastic hollow body.

22. Plastic body according to claim 20, wherein said body is a hollow body of polyolefin, PET or PVC.

23. Plastic body according to claim 20, wherein said body has a barrier layer in a thickness of 4 to 20 μm.

24. Plastic body according to claim 22, wherein said polyolefin is polyethylene or polyproplylene.

25. Plastic body according to claim 21, wherein said plastic body is a fuel tank or an oil tank.

26. Plastic body according to claim 20, wherein barrier layer further comprises
d) 0.1 to 25% by weight, based on the total composition, of additives which are compatible with the barrier layer composition.

27. Plastic body according to claim 26, wherein said plastic body is a fuel tank or an oil tank.

28. Plastic body according to claim 26, wherein said plastic body is made of a polyolefin or a PET or PVC.

* * * * *